United States Patent
Chheda

(10) Patent No.: US 7,046,467 B1
(45) Date of Patent: May 16, 2006

(54) METHOD FOR GENERATING A FORMAT SPECIFIC DATA STRUCTURE IN A DISK DRIVE HAVING DIFFERING SURFACE FORMATS

(75) Inventor: Nalin H. Chheda, Cerritos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 266 days.

(21) Appl. No.: 10/427,760

(22) Filed: Apr. 30, 2003

(51) Int. Cl.
*G11B 5/09* (2006.01)

(52) U.S. Cl. .......................... 360/51; 360/48
(58) Field of Classification Search .............. 360/51, 360/48, 77.02, 77.088; 711/202
See application file for complete search history.

(56) References Cited

U.S. PATENT DOCUMENTS

| | | | |
|---|---|---|---|
| 5,271,018 A | 12/1993 | Chan | |
| 5,561,566 A | 10/1996 | Kigami et al. | |
| 5,822,142 A | 10/1998 | Hicken | |
| 5,983,309 A | 11/1999 | Atsatt et al. | |
| 6,091,559 A | 7/2000 | Emo et al. | |
| 6,137,644 A | 10/2000 | Hetzler et al. | |
| 6,233,106 B1 | 5/2001 | Chambers | |
| 6,239,937 B1 | 5/2001 | Troemel | |
| 6,256,160 B1 | 7/2001 | Liikanen et al. | |
| 6,282,041 B1 * | 8/2001 | Blumenau | 360/48 |
| 6,327,641 B1 | 12/2001 | Xiao et al. | |
| 6,393,511 B1 | 5/2002 | Albrecht et al. | |
| 6,445,525 B1 | 9/2002 | Young | |
| 6,560,052 B1 | 5/2003 | Ng et al. | |
| 6,591,339 B1 | 7/2003 | Horst et al. | |
| 6,757,119 B1 | 6/2004 | Leow et al. | |
| 6,898,044 B1 * | 5/2005 | Chheda | 360/75 |
| 2003/0065872 A1 | 4/2003 | Edgar et al. | |

\* cited by examiner

*Primary Examiner*—David Hudspeth
*Assistant Examiner*—Varsha A. Kapadia
(74) *Attorney, Agent, or Firm*—Ramin Mobarhan, Esq.

(57) ABSTRACT

A method is disclosed for selecting format specific parameters in a disk drive comprising a control system and a plurality of disk surfaces each having a surface format for storing data, wherein at least one surface format is different than other surface formats. The method includes initializing the disk drive for operation, receiving a data transfer command, and selecting a disk surface for performing data transfer operations based on the received data transfer command. The method further includes selecting a format specific data structure corresponding to the selected disk surface, generating a second format specific data structure from the first format specific data structure, and performing the data transfer operations by the control system based on the calculated variable.

18 Claims, 6 Drawing Sheets

METHOD FOR GENERATING A FORMAT SPECIFIC DATA STRUCTURE IN A DISK DRIVE HAVING DIFFERING SURFACE FORMATS

FIELD OF THE INVENTION

This invention relates to logical zones on disks in a disk drive. More particularly, the invention is directed to obtaining timing map data for a zone on a disk.

BACKGROUND OF THE INVENTION

Disk drives conventionally partition disk surfaces into logical zones for optimizing storage capacity by varying bit density within each of the logical zones. The zones may be visualized as concentric bands of tracks with a varying progression of bit density from band to band. Each zone stores a range of user data blocks which are addressed by a host computer using a logical block address (LBA). The disk drive comprises an intelligent control system which translates the host specified LBA into an internal address. As is known in the art, the internal address may result from a translation process that translates the LBA into an internal absolute block address (ABA) that is eventually translated into a physical sector address and track address.

The disk drive control system may maintain a set of zone tables where each table provides information about the zone including for example an address of the first user data block in the zone. Other parameters in the zone table enable the control system to determine in which zone a given user data block resides by searching the zone tables to locate the sector corresponding to the block address.

Additionally, the disk drive control system may maintain a set of timing map tables (sometime referred to as a hard-sector description table (HSDT) by those in the art) where each table describes a sector in terms of its timeout counter (TOC), the wedge the sector belongs to, sector splits and other data corresponding to a location of a selected sector on a disk surface. These data are then used by control system which searches for the data in the timing map table, to verify the correct positioning of the head over a desired portion of the disk surface. The timing map tables are also aligned with zone table boundaries for disk cylinders.

In most cases, the disk drive control system can accomplish the timing map table search without compromising performance because the timing map tables are stored in memory when the drive is initialized for operation and only one set of tables is required because each disk surface has an identical format. The highly competitive disk drive market has more recently driven initiatives to minimize cost by allowing for variations in surface format such that multiple sets of timing map tables may be required. Detrimentally, this could require increased memory for storing the tables and increased processor execution overhead to perform searches of the expanded tables.

Accordingly, what is needed is a method for obtaining timing-map data, while reducing the need for increased memory for storing the tables and the processor execution overhead.

SUMMARY OF THE INVENTION

This invention can be regarded as a method of selecting format specific parameters in a disk drive comprising a control system and a plurality of disk surfaces each having a surface format for storing data, wherein at least one surface format is different than other surface formats. The method includes initializing the disk drive for operation, receiving a data transfer command, and selecting a disk surface for performing data transfer operations based on the received data transfer command.

The method further includes selecting a format specific data structure corresponding to the selected disk surface, generating a second format specific data structure from the first format specific data structure, and performing the data transfer operations by the control system based on the calculated variable.

DETAILED DESCRIPTION OF THE INVENTION

Figure 1:
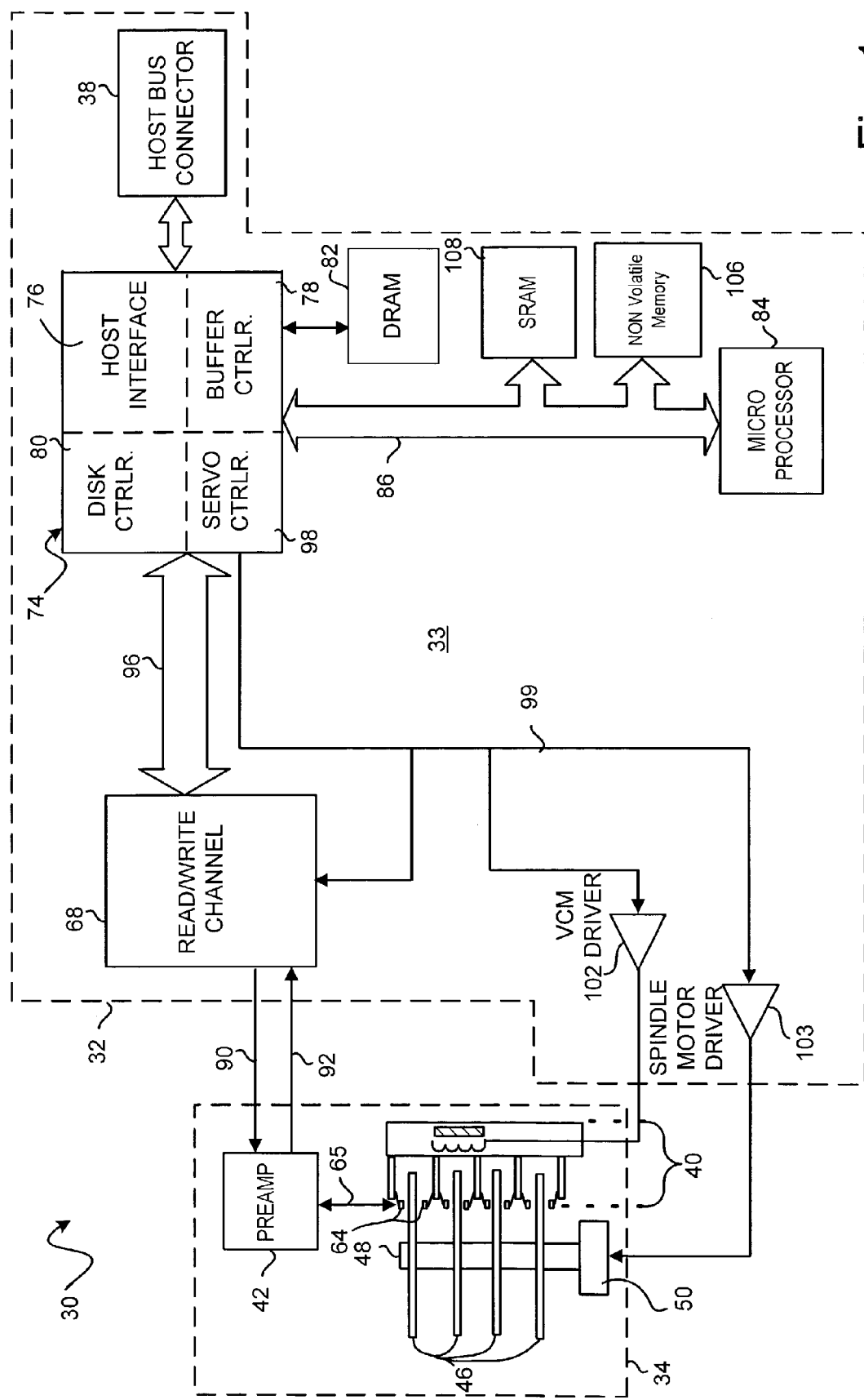
FIG. 1 is a block diagram of a disk drive in which the invention may be practiced.

With reference to FIG. 1, a block diagram of a disk drive 30 is shown in which the invention may be practiced. Disk drive 30 is connectable to a host computer (not shown) via host bus connector 38 for the transfer of commands, status and data. One suitable standard for such connection is the Advanced Technology Attachment (ATA) standard presently favored for desktop personal computers. Disk drive 30 comprises a Head Disk Assembly (HDA) 34, and a disk drive control system 33 mounted on a printed circuit board assembly (PCBA) 32.

As shown in FIG. 1, HDA 34 comprises one or more disks 46 for data storage; a spindle motor 50 for rapidly spinning each disk 46 (four shown) on a spindle hub 48; and an actuator assembly 40 for swinging heads 64 in unison over each disk 46. The heads 64 are connected to a preamplifier 42 via a trace assembly 65 for reading and writing data on disks 46. Preamplifier 42 is connected to channel circuitry in control system 33 via read data line 92 and write data line 90.

The control system 33 comprises a read/write channel 68, host interface and disk controller (HIDC) 74, voice coil motor driver (VCM) 102, spindle motor driver (SMD) 103, microprocessor 84, and several memory arrays such as dynamic random access memory (DRAM) 82, static random access memory (SRAM) 108, and non-volatile memory 106. A serial bus 99 provides a medium for bi-directional transfer of digital data for programming and monitoring channel 68, VCM driver 102 and SMD 103. Host-initiated operations for reading and writing data in disk drive 30 are executed under control of microprocessor 84 connected to the controllers and memory arrays via a bus 86. Program code executed by microprocessor 84 maybe stored in memory arrays DRAM 82, SRAM 108 and non-volatile memory 106. DRAM 82 may also serve as a cache memory for data read from or written to the disk as is well known in the art.

During disk read and write operations, data transferred by preamplifier 42 is decoded and encoded by read/write channel 68. During read operations, channel 68 decodes data into digital bits transferred on an NRZ bus 96 to HIDC 74. During write operations, HIDC 74 provides digital data over the NRZ bus 96 to read/write channel 68 which encodes the data prior to its transmittal to preamplifier 42.

The HIDC 74 comprises a disk controller 80 for formatting and providing error detection and correction of disk data, a host interface controller 76 for responding to commands from host 36, and a buffer controller 78 for storing data which is transferred between disks 46 and host (not shown). Collectively the controllers in HIDC 74 provide automated functions which assist microprocessor 84 in controlling disk operations.

The servo controller circuit 98 in HIDC 74 provides an interface between microprocessor 84 and actuator assembly 40 and spindle motor 50. Microprocessor 84 commands logic in servo controller 98 to position actuator 40 using a VCM driver 102 to precisely control the rotation of spindle motor 50 with a spindle motor driver 103.

Figure 2:
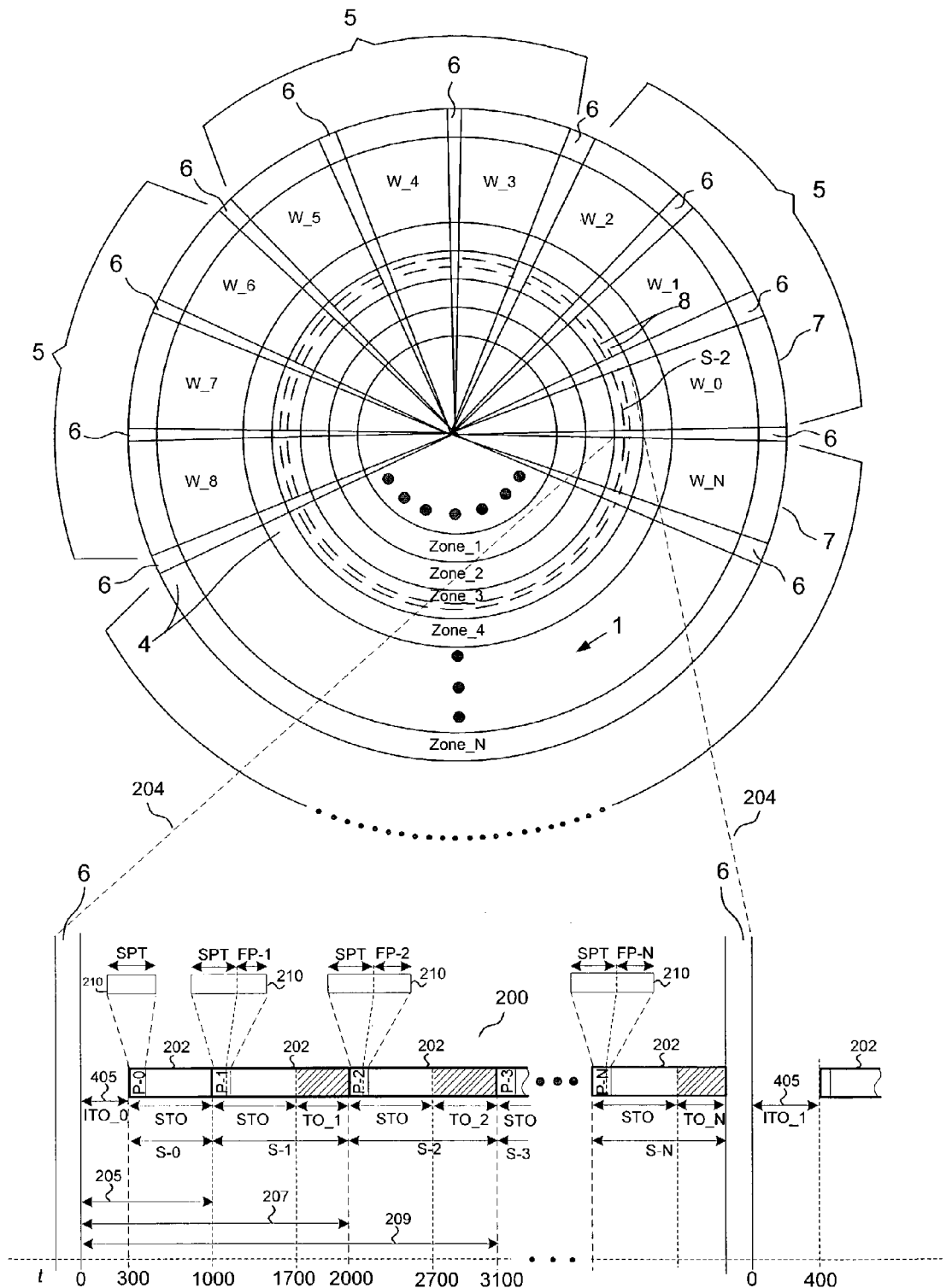
FIG. 2 illustrate a disk formatted for use with a disk drive employing an embodiment of the present invention.

FIG. 2 illustrates a disk 46 formatted for use with disk drive 30 shown in FIG. 1. The disk 46 has two surfaces 1 and 2 (not shown) that are of different surface formats from one another. Each of disk surface 1 and 2 is partitioned into radially-spaced concentric zones 4, such as zone_1 through zone_N, each of which have a number of tracks 8. Each track 8 comprises data sectors, such as data sector S-2. Each disk surface further includes embedded servo sectors 6 disposed on the disk surfaces between angularly-spaced wedge-like areas 7, such as W_0 through W_N, for use in positioning the head 64 over a desired track 8 during write and read operations. Suitably, data sectors are recorded in the intervals between servo sectors 6 on each track 8. Servo sectors 6 are then sampled at regular intervals by channel 68, and are processed by servo controller 98 to provide position information to microprocessor 84 via bus 86. In an embodiment of the present invention, each disk surface is logically partitioned into wedge-groups 5, with each wedge-group 5 having the same number of wedges 7, such as three, as the other wedge-groups 5. Suitably, each data sector in each wedge 7 of a wedge-group 5 has the same timing value as a corresponding sector in a corresponding wedge 7 of other wedge-groups 5.

Figure 3:
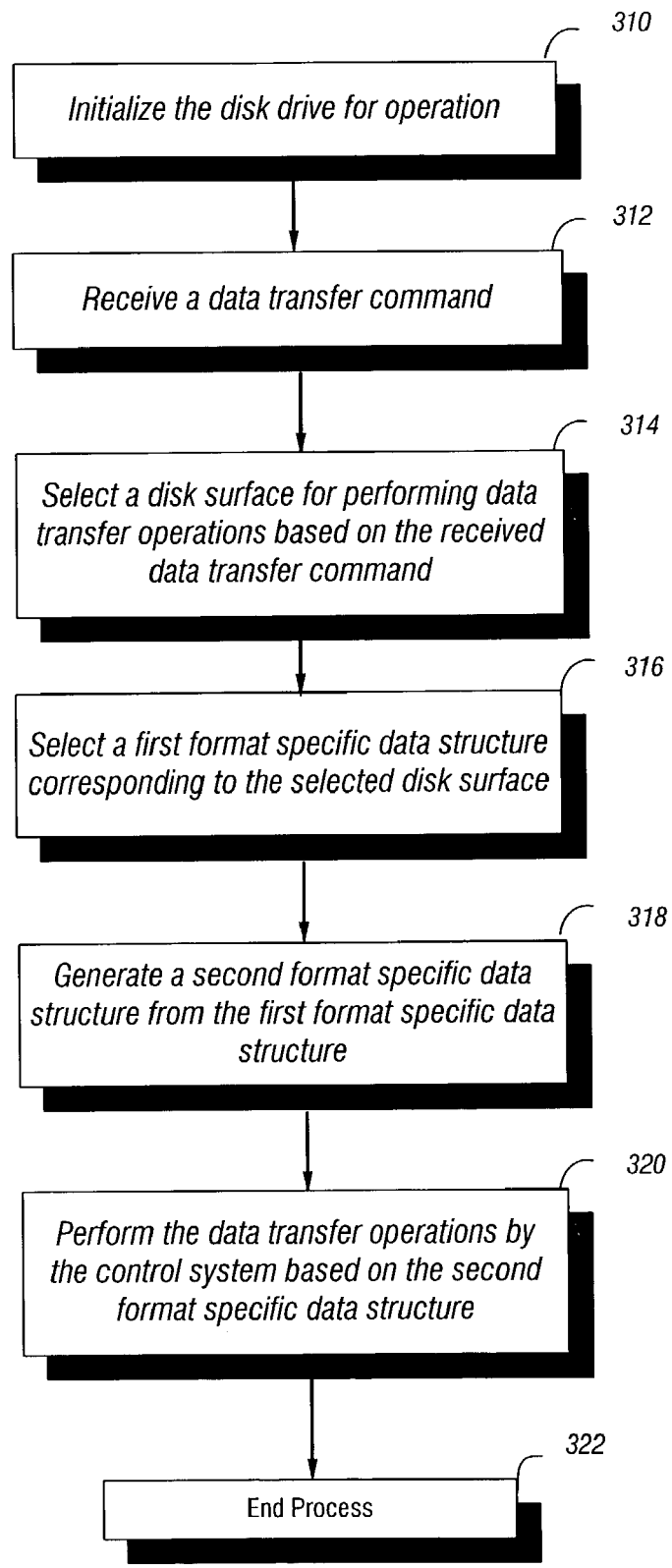
FIG. 3 is a flow chart illustrating a process used in an embodiment of the invention.

Referring to FIG. 3 in conjunction with FIG. 2, a process used in an embodiment of the invention is illustrated for selecting format specific parameters in a disk drive. As shown, the process begins at block 310 in which the disk drive 30 is initialized for operation. Next, in block 312, a data transfer command is received in the disk drive 30. Suitably, the data transfer command is received from a host computer (not shown) in communication with the disk drive 30.

Next, in block 314, a disk surface (such as disk surface 1 or 2) is selected for performing data transfer operations based on the received data transfer command. Next, in block 316, a first format specific data structure is selected that corresponds to the selected disk surface, such as to disk surface 1, as described below and in greater detail in conjunction with FIG. 4A.

Next, in block 318, a second format specific data structure is generated from the first format specific data structure, as described below and in greater detail in conjunction with FIGS. 4A–C. Next, in block 320, the data transfer operations are performed by the control system 33 based on the second format specific data structure. The flow then proceeds to block 322 in which the process ends.

Figure 4A:
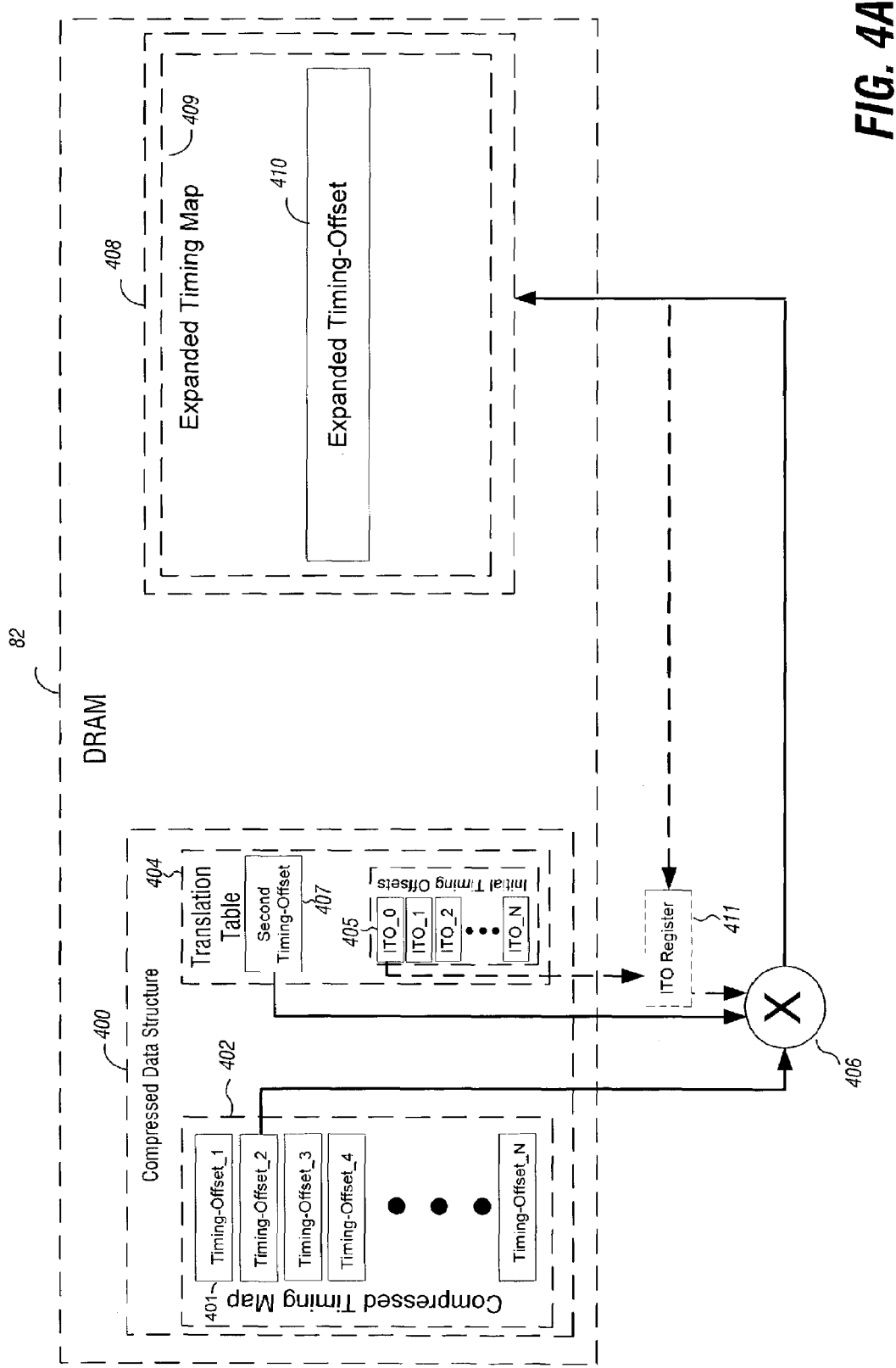
FIG. 4A is a block diagram illustrating an embodiment of the invention.

FIG. 4A, in conjunction with FIG. 2, illustrates in greater detail the selecting process in block 316 of FIG. 3. As shown in FIG. 4A, the selected first format specific data structure is a compressed data structure 400. Suitably, the compressed data structure 400 corresponds to a selected zone 4, such as zone_3, having a plurality of sectors, such as sector S-2. The compressed data structure 400 comprises a compressed timing map 402 for performing the data transfer operations by the control system 33, such as for the selected zone_3, and a translation table 404 corresponding to the compressed data structure 400, such as for the selected zone_3. Suitably, the compressed data structure 400 is stored in DRAM 82.

The compressed timing map 402 includes first timing offsets 401, such as Timing-Offset_1 through Timing-Offset_N. In one embodiment of the present invention, each timing offset 401 corresponds to a different sector in the plurality of sectors in the selected zone 4, such as to sector S-2 in zone_3. In this embodiment, the translation table 404 includes a second timing offset 407 which corresponds to each sector in the plurality of sectors in the selected zone 4, such as to each of sectors in zone_3. The translation table 404 also includes a plurality of initial timing offsets 405, such as ITO_0 through ITO-N, where N is number of wedges in a wedge group 5, wherein each timing offset 405, such as ITO_0 corresponds to a selected wedge 7 of a wedge group 5 in the selected zone 4, such as to wedge W_0 of zone_3. In another embodiment of the present invention, each timing offset 401 corresponds to a first preamble-field timing offset wherein each first preamble-field timing offset corresponds to a different sector in the plurality of sectors in the selected zone 4, such as to sector S-2 in zone_3. In this embodiment, the translation table 404 includes a second timing offset 407 for a second preamble-field timing offset corresponding to each sector in the plurality of sectors in the selected zone 4, such as to all sectors in the selected zone_3.

Figure 4B:
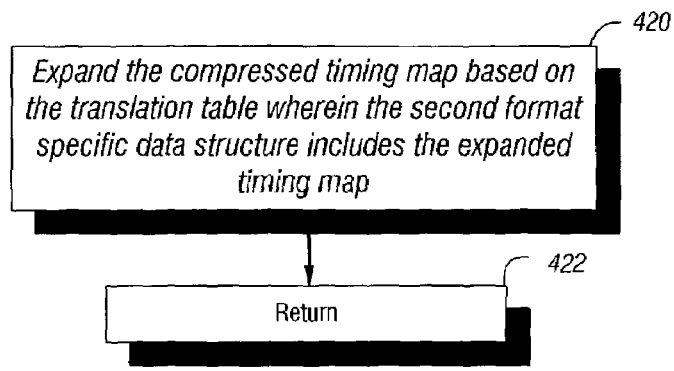
FIGS. 4B–C are flow charts further illustrating the process used in the embodiment of the invention shown in FIG. 4A.
Figure 4C:
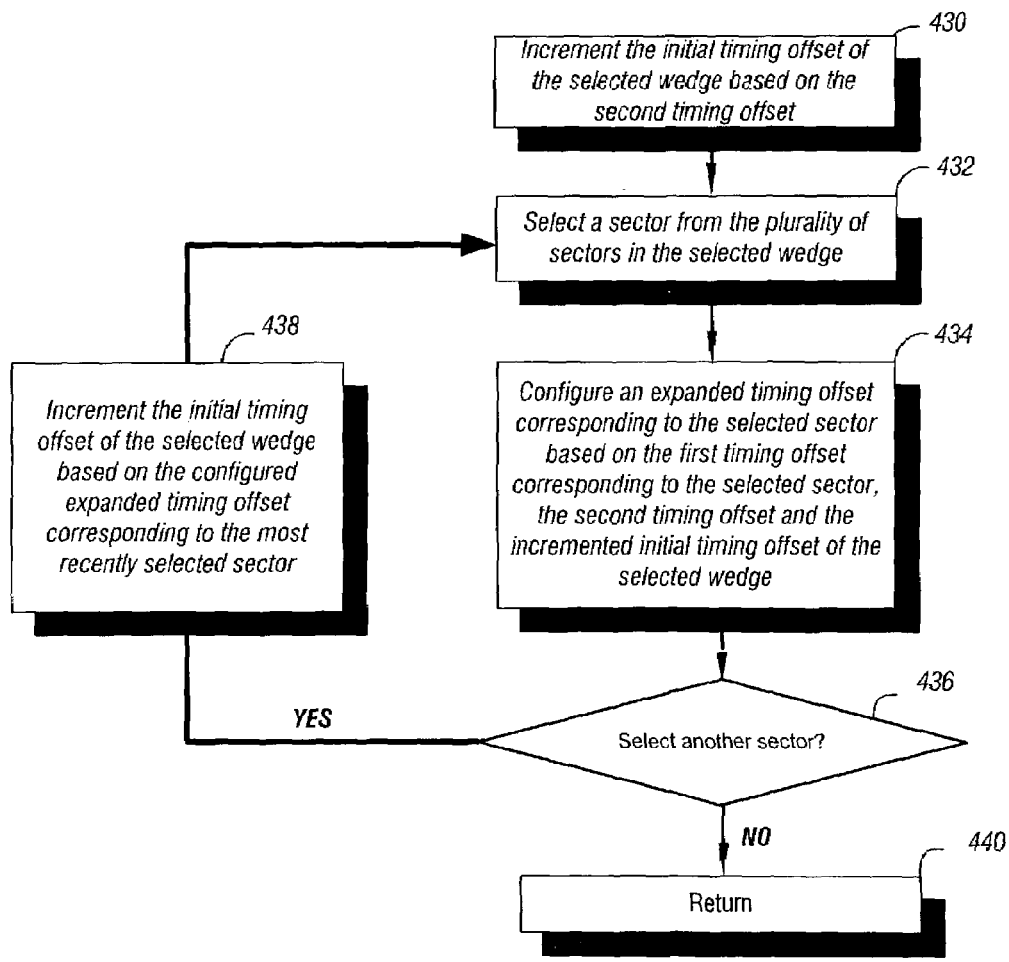

For ease of illustrating the processes of the present invention shown in FIGS. 4A–C, an exemplary disk 46 with two surfaces 1 and 2 having different surface formats is provided in FIG. 2 and used throughout the detailed description. As shown by lines 204, the timing-diagram 200 is a linear representation of a portion of circular track 8 of surface 1 of disk 46 that lies in a selected zone 4 of a selected wedge 7, such as in zone_3 of wedge W_0. Each timing block 202 corresponds to one sector, such as to one of sectors S-0 through S-N, in the selected zone_3 of wedge W_0, and whose graphical size is allocated based on a pre-calculated length of time associated with the passing of each sector under a head 64 based on the rotation speed of the disk 46. For example, a clockwise rotation of disk 46 would first position the initial timing offset 405 of ITO_0 beneath a head 64 (not shown), followed by each of sectors S-0 through S-N, respectively.

Currently in the art, the location of a selected sector, such as sector S-2, is determined by the length of time calculated from when the servo sector 6 preceding the selected sector passes beneath a head 64, as shown by timing values 205, 207 and corresponding to sectors S-1, S-3 and S-3. The timing value for each of the sectors is then stored in a timing map table (sometime referred to as a hard-sector description table (HSDT) by those in the art) having the foregoing timing values and other data corresponding to locations of selected sectors on a selected zone 4 of a disk surface with which the position of a head 64 on a disk surface is compared by the control system 33 to verify the correct positioning of the head 64 over a desired sector on the disk surface. As shown by the timing-diagram 200, within each wedge 7 the timing values become progressively larger for each of sectors S-0 through S-N, thus requiring allocation of larger storage fields in an HSDT table. For example, the stored values associated with timing values 205, 207 and 209 may be 1000, 2000, and 3100, respectively. In addition, as also shown in FIG. 2, the timing value for the initial timing offsets 405, can be different from one wedge 7 to the next, such as ITO_0 having a value of 300 and ITO-1 having a value of 400, thus requiring the storage in the HSDT table of the timing value of a different initial timing offsets 405 for each wedge 7 in disk 46. It is therefore desirable to reduce the amount of storage space in memory associated with the storage of the foregoing timing values.

As described above, in one embodiment of the present invention, each timing offset 401 corresponds to a different sector in the plurality of sectors in the selected zone 4, such as to sector S-2 in zone_3. In this embodiment, the translation table 404 includes a second timing offset 407 which corresponds to each sector in the plurality of sectors in the selected zone 4, such as to each of sectors in zone_3. The translation table 404 also includes a plurality of initial timing offsets 405, such as ITO_through ITO-N, where N is number of wedges in a wedge group 5, wherein each timing offset 405, such as ITO_0 corresponds to a selected wedge 7 of a wedge group 5 in the selected zone 4, such as to wedge W-0 of zone_3. In the above example, the second timing offset 407 is represented by STO, and is the timing-block 202 for the first sector following the initial timing offset 405 of ITO_0, (i.e. for sector S-0), here set to 700 msec (i.e. 1000 minus 300). In the present invention, all sectors in each wedge 7 are of timing blocks 202 equal to or greater than the first sector following the initial timing offset 405 for that wedge. The timing-offsets 401 for each subsequent sector S-1 though S-N is then determined as the timing difference between the timing block 202 of that sector and the second timing offset 407, (i.e. the STO). In the above example, the Timing-Offset_2 for sector S-2 is 400 (i.e. 3100 minus 2700) shown as TO_2 and represented by the shaded portion of timing block 202 for sector S-2. Since the timing-offsets 401 for each of sectors S-1 through S-N (shown as TO_1 to TO_N are FIG. 2) are smaller than the timing blocks 202 or timing values for that sector, they can be stored in the correspondingly smaller memory fields of the compressed timing map 402, as Timing-Offset_1 through Timing-Offset_N, respectively.

As also described above, in another embodiment of the present invention, each timing offset 401 corresponds to a first preamble-field timing offset wherein each first preamble-field timing offset corresponds to a different sector in the plurality of sectors in the selected zone 4, such as to sector S-2 in zone_3. In this embodiment, the translation table 404 includes a second timing offset 407 for a second preamble-field timing offset corresponding to each sector in the plurality of sectors in the selected zone 4, such as to all sectors in the selected zone_3. In the above example, the second timing offset 407 is the second preamble-field timing offset and represented by SPT, and is the timing value for the preamble-field P-0 of sector_0.). In the present invention, all sectors in each wedge 7 are of preamble-fields equal to or greater than the first sector following the initial timing offset 405 for that wedge. The first preamble-field timing offsets for each subsequent sector S-1 though S-N is then determined as the timing difference between the timing block for the preamble field of that sector and the second timing offset 407, (i.e. the SPT). Since the first preamble-field timing offsets (shown as FP-1 to FP-N are FIG. 2) for each of sectors S-1 though S-N are smaller than the preamble fields P-1 to P-N for that sector, they can be stored in the correspondingly smaller memory fields of the compressed timing map 402, as Timing-Offset_1 through Timing-Offset_N, respectively.

One advantage of the present invention over the prior art is that by storing only timing differences in a compressed timing map 402, the need for allocation of large storage field for storage of full lengths of timing blocks or timing values is minimized.

FIG. 4A also illustrates the generating process in block 318 of FIG. 3, as shown by the operational block 406, and the flow chart of FIG. 4B. As shown in FIG. 4B, the process begins at block 420 in which the compressed timing map 402 is expanded based on the translation table 404 into an expanded timing map 409, as described in greater detail in conjunction with FIG. 4C, resulting in the generating of the second format specific data structure 408 which comprises the expanded timing map 409. Suitably, the expanded timing map 409 comprises a table (sometime referred to as a hard-sector description table (HSDT) by those in the art) having timing data corresponding to locations of selected sectors on a selected zone 4 of a disk surface with which the position of a head 64 on a disk surface is compared by the control system 33 to verify the correct positioning of the head 64 over a desired portion of the disk surface. Suitably, the second format specific data structure 408 is stored in DRAM 82 for access by the disk controller 80 of the control system 33. Returning to FIG. 4B, the flow then proceeds to block 422 in which the process is returned to block 318 of FIG. 3.

FIG. 4C further illustrates the expanding process shown in block 420 of FIG. 4B for one embodiment of the present invention, in which each timing offset 401 corresponds to a different sector in the plurality of sectors in the selected zone 4, such as to sector S-1 in zone_3. In this embodiment, the translation table 404 includes a second timing offset 407 which corresponds to each sector in the plurality of sectors in the selected zone 4, such as to each of sectors in zone_3. The translation table 404 also includes a plurality of initial timing offsets 405, such as ITO_0 through ITO-N, where N is number of wedges in a wedge group 5, wherein each timing offset 405, such as ITO_0 corresponds to a selected wedge 7 of a wedge group 5 in the selected zone 4, such as to wedge W_0 of zone_3. As shown in FIG. 4C, the process begins at block 430 in which the initial timing offset 405 of the selected wedge 7 is incremented based on the second timing offset 407. In the above example, the ITO_0 for wedge W_0 is incremented by STO, so that the incremented value of ITO-0 is equal to that of timing value 205. As shown in FIG. 4A, the initial timing offset 405 for a selected wedge, such as ITO_0 for wedge W_0 is loaded into an ITO Register 411 in which each instance of the incrementing of the initial timing offset is stored. Suitably, ITO Register 411 is a numerical accumulator in SRAM 108 which holds the most recently incremented value of the initial timing offset which corresponds to the most recently selected sector.

Next, in block 432, a first sector is selected from the plurality of sectors in the selected wedge. In the above example, a sector S-1 is selected from the wedge W-0. Next, in block 434, an expanded timing offset 410 corresponding to the selected first sector is configured based on the first timing offset 401 corresponding to the selected first sector, such as Timing-Offset_1, the second timing offset 407, and the incremented initial timing offset 405 of the selected wedge 7, such as wedge W_0. In the above example, an expanded timing offset 410 is configured for sector S-1 based on the configuring of STO with TO_1, and the addition of the incremented initial timing offset 405 of ITO-0 (i.e. ITO-0 plus STO) for the selected wedge W_0. The expanded timing offset 410 for sector S-1 is therefore ITO_0 plus STO (for sector S-0) plus STO (for sector S-1) plus TO_1, or equivalent to the timing value 207. Suitably this expanded timing offset 410 for sector S-1 is stored in ITO Register 411 for subsequent use.

Next, in decision block 436, it is determined whether another sector is to be selected. If another sector is to be selected, then the process flow proceeds to block 438 in which the initial timing offset value 405 of the selected wedge is incremented based on the configured expanded timing offset 410 corresponding to the most recently selected sector. In the above example, the initial timing offset value 405 is incremented to value stored in ITO Register 411 at the end of block 434 as described above (i.e. the value equivalent to the timing value 207).

Next, the flow is returned to block 432 in which another sector is selected from the plurality of sectors in the selected wedge, such as sector S-2 in wedge W_0 in the above example. An expanded timing offset corresponding to the newly selected sector S-2 is then configured based on the first timing offset corresponding to the selected sector S-2 (i.e. TO-2), the second timing offset and the incremented initial timing offset (i.e. the value equivalent to the timing value 207). In the above example, the expanded timing offset 410 for sector S-2 is therefore timing value 207 plus STO (for sector S-2) plus TO_2, or equivalent to the timing value 209. Suitably this expanded timing offset 410 for sector S-2 is stored in ITO Register 411 for subsequent use.

Figure 5:
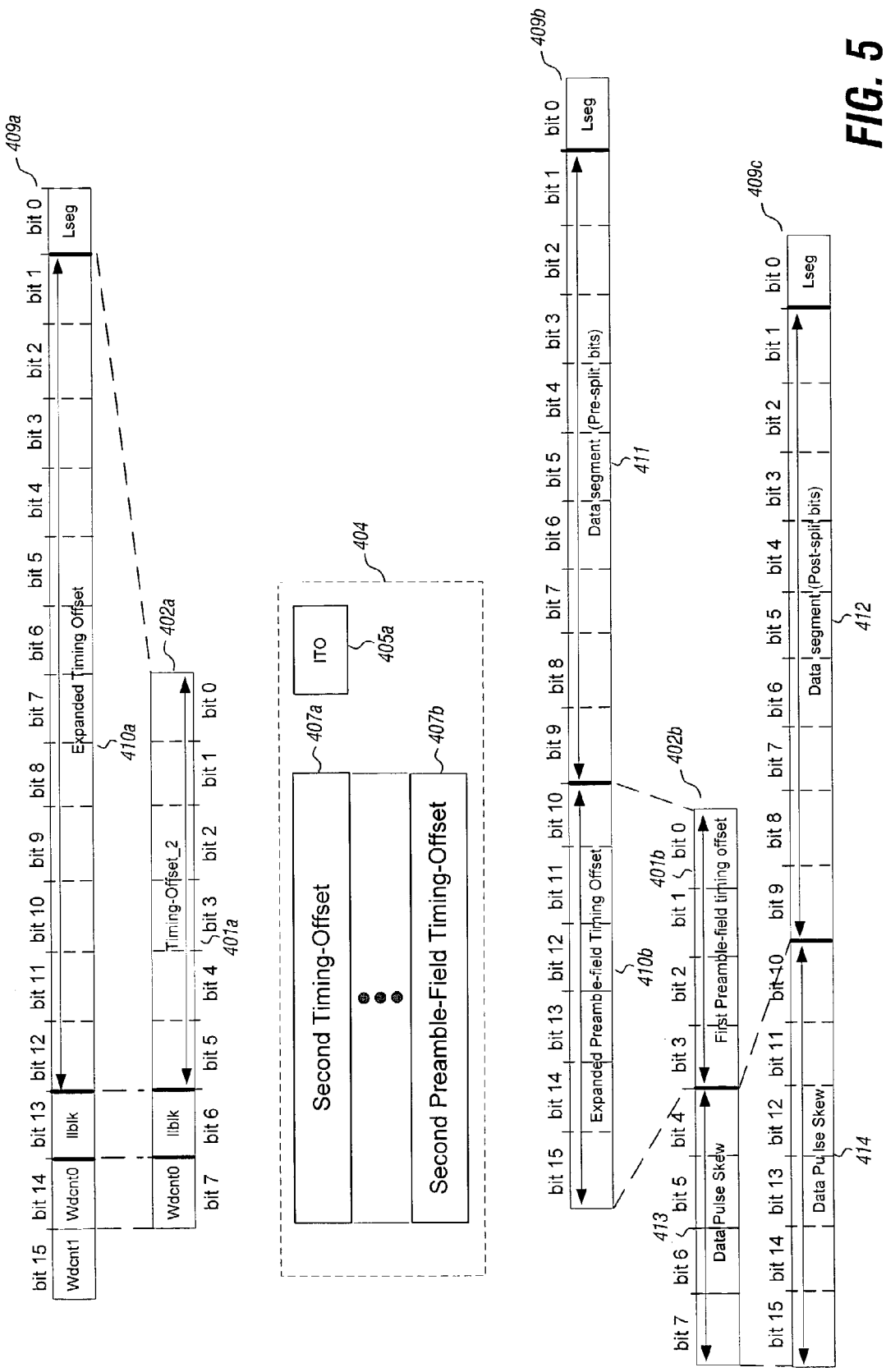
FIG. 5 is another block diagram illustrating an embodiment of the invention.

Returning to decision block 436, if it is determined that another sector is to be selected. then the flow then proceeds to block 440 in which the process is returned to block 420 of FIG. 4B. FIG. 5 provides a further example for the process of FIG. 4C in which TO_2 for sector S-2 is stored as Timing-Offset_2, and occupying only 6 bits (bit 0 to bit 5) in the compressed timing map 402a. The STO is stored as Second Timing-Offset 407 in the translation table 404. An expanded timing offset 410a is then configured based on the Timing-Offset_2 401a, the second timing-offset 407a, and the ITO 405a and stored in the expanded timing map 409a. As shown, the expanded timing offset 410a occupies 12 bits, or twice the size of Timing-Offset_2.

The process described above in conjunction with FIG. 4C can also be readily used with another embodiment of the present invention in which each timing offset 401 corresponds to a first preamble-field timing offset wherein each first preamble-field timing offset corresponds to a different sector in the plurality of sectors in the selected zone 4, and wherein the translation table 404 includes a second timing offset 407 for a second preamble-field timing offset corresponding to each sector in the plurality of sectors in the selected zone 4. Suitably, the use of an initial timing offset 405 is not needed for this expansion. FIG. 5 provides a further example for the process of FIG. 4C for this embodiment of the present invention, in which FP-2 for sector S-2 is stored as a first preamble-field timing offset_2 401b, and occupying only 4 bits (bit 0 to bit 3) in the compressed timing map 402b. The SPT is stored as second preamble-field timing offset 407b in the translation table 404. An expanded preamble-field timing offset 410b is then configured based on the first preamble-field timing offset-2 401b, and the second preamble-field timing offset 407b, and stored in the expanded timing map 409b. Suitably, the initial timing offset 405a is not needed for this expansion. As shown, the expanded timing offset 410b occupies 5 bits, or 1.5 times the size of first preamble-field timing offset_2 401b. Suitably the expanded preamble-field timing offset 410b is expressed in byte counts in the second format specific data structure 408.

Suitably, the compressed timing map 402b further comprises a compressed data pulse skew field 413 used for optimizing the read/write operations for a selected sector which can be expanded into pulse skew field 414 in the expanded timing map 409c. The expanded timing map 409b and 409c also suitably further comprise of data segments 411 and 412 which as shown can be appended to the expanded preamble-field timing offset 410b, and expanded pulse skew field 414, respectively.

It should be noted that the various foregoing embodiments and their associated features were discussed separately for clarity of description only and they can be incorporated in whole or in part into a single embodiment of the present invention having all or some of these embodiments and features.

What is claimed is:

1. A method for selecting format specific parameters in a disk drive comprising a control system and a plurality of disk surfaces each having a surface format for storing data, wherein at least one surface format is different than other surface formats, the method comprising:
   initializing the disk drive for operation;
   receiving a data transfer command;
   selecting a disk surface for performing data transfer operations based on the received data transfer command;
   selecting a first format specific data structure comprising timing data related to data transfer operations and corresponding to the selected disk surface;
   generating a second format specific data structure from the first format specific data structure based on the timing data; and
   performing the data transfer operations by the control system based on the second format specific data structure.

2. The method as claimed in claim 1, wherein the first format specific data structure is a compressed data structure.

3. The method as claimed in claim 2, wherein the compressed data structure comprises:
   a compressed timing map for performing the data transfer operations by the control system; and
   a translation table corresponding to the compressed data structure.

4. The method as claimed in claim 3, wherein the generating further comprises:
   expanding the compressed timing map based on the translation table wherein the second format specific data structure comprises the expanded timing map.

5. The method as claimed in claim 4, wherein the selected disk surface comprises a plurality of wedges and a plurality of zones traversing the wedges, each zone having at least one track having a plurality of sectors, wherein the compressed data structure corresponds to a selected zone.

6. The method as claimed in claim 5, wherein the selected disk surface is logically partitioned into a plurality of wedge-groups having the same number of wedges in each wedge-group,
   wherein each sector in each wedge of a wedge-group having the same timing value as a corresponding sector in a corresponding wedge of other wedge-groups.

7. The method as claimed in claim 6, wherein the compressed data structure comprises a plurality of first timing offsets, wherein each first timing offset corresponds to a different sector in the plurality of sectors.

8. The method as claimed in claim 7, wherein the translation table comprises a second timing offset corresponding to each sector in the plurality of sectors in the selected zone.

9. The method as claimed in claim 8, wherein the translation table further comprises a plurality of initial timing offsets, wherein each timing offset corresponds to a selected wedge of a wedge group in the selected zone, wherein each wedge of a wedge-group having the same initial timing offset as a corresponding wedge of other wedge-groups.

10. The method as claimed in claim 9, wherein the expanding further comprises:

selecting a first sector from the plurality of sectors in the selected wedge; and configuring an expanded timing offset corresponding to the selected first sector based on the first timing offset corresponding to the selected first sector, the second timing offset and the initial timing offset value of the selected wedge.

11. The method as claimed in claim 10, wherein the expanding further comprises;

incrementing the initial timing Offset value of the selected wedge based on the configured expanded timing offset corresponding to the most recently selected sector.

12. The method as claimed in claim 11, wherein the expanding further comprises:

selecting a second sector from the plurality of sectors in the selected wedge; and configuring an expanded timing offset corresponding to the selected second sector based on the first timing offset corresponding to the selected second sector, the second timing offset and the incremented initial timing offset value.

13. The method as claimed in claim 5, wherein the compressed data structure includes a first preamble-field timing offset value wherein each first preamble-field timing offset corresponds to a different sector in the plurality of sectors.

14. The method as claimed in claim 13, wherein the translation table includes a second preamble-field timing-offset value corresponding to each sector in the plurality of sectors in the selected zone.

15. The method as claimed in claim 14, wherein the expanding further comprises:

configuring an expanded preamble-field timing offset corresponding to a selected sector based on the first preamble-field timing offset corresponding to the selected sector and the second preamble-field timing offset.

16. The method as claimed in claim 3, wherein the second format specific data structure comprises a hard-sector description table (HSDT) containing the expanded timing map.

17. The method as claimed in claim 16, wherein control system further comprises a disk controller and wherein the expanded timing map is stored in memory and accessed by the disk controller.

18. The method as claimed in claim 1, wherein the data transfer command is received from a host computer in communication with the disk drive.

* * * * *